United States Patent
Nakao et al.

[15] 3,651,659
[45] Mar. 28, 1972

[54] AIR-CONDITIONING APPARATUS IN VEHICLE

[72] Inventors: Minoru Nakao; Syozo Yamamoto, both of Osaka, Japan

[73] Assignee: Shikishima Spinning Co. Ltd., Osaka-shi, Japan

[22] Filed: June 30, 1969

[21] Appl. No.: 837,430

[52] U.S. Cl. ...................62/239, 55/314, 55/467, 55/500, 98/2.11, 98/317
[51] Int. Cl. .......................................................B60h 3/04
[58] Field of Search ............................55/267, 268–269, 55/309–314, 328, 385, 497–500; 62/317, 239; 98/2.11; 74/89.15

[56] References Cited

UNITED STATES PATENTS

| | | | |
|---|---|---|---|
| 950,825 | 3/1910 | Pill | 261/124 |
| 2,017,579 | 10/1935 | Anderson | 98/2 |
| 2,575,499 | 11/1951 | Manow | 55/493 |
| 2,761,291 | 9/1956 | Golding | 98/2 |
| 3,288,048 | 11/1966 | Laing | 98/2 |
| 2,036,485 | 4/1936 | Lintern et al. | 98/2 |
| 2,074,152 | 3/1937 | Mueller | 55/268 |
| 2,316,309 | 4/1943 | Blair | 49/340 |
| 2,573,419 | 10/1951 | Emery | 98/2 |
| 2,901,226 | 8/1959 | Modine | 55/267 |
| 3,229,609 | 1/1966 | Larson et al. | 55/DIG. 29 |
| 3,301,167 | 1/1967 | Howard et al. | 55/DIG. 29 |
| 3,356,006 | 12/1967 | Scott | 55/470 |
| 3,411,272 | 11/1968 | Carmon | 55/328 |

Primary Examiner—Frank W. Lutter
Assistant Examiner—Bernard Nozick
Attorney—Hall & Houghton

[57] ABSTRACT

An apparatus wherein an automobile air conditioner is provided with air recirculating means, air cooling means, and an air filter of a texture capable of removing smoke from the air, and with means operated for effectively inserting the air filter in, and removing it from, the path of air circulating through the cooling means depending on whether the air in the passenger compartment is or is not so smoke laden as to require smoke removal therefrom.

3 Claims, 6 Drawing Figures

PATENTED MAR 28 1972

INVENTORS
MINORU NAKAO,
SYOZO YAMAMOTO

BY Hall, Hughes

ATTORNEY

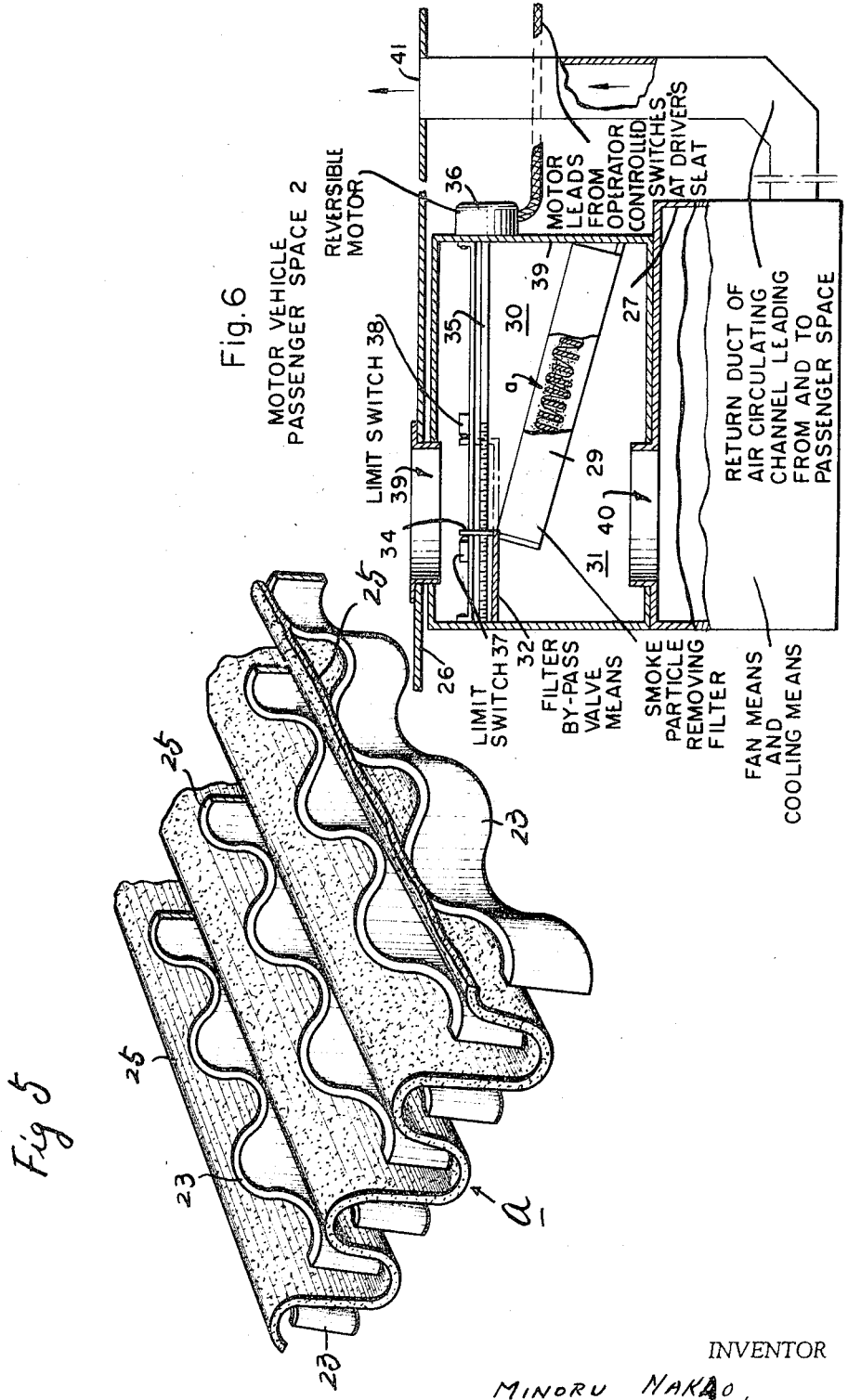

AIR-CONDITIONING APPARATUS IN VEHICLE

BACKGROUND OF THE INVENTION

1. Field of the Invention

The present invention relates to an apparatus for filtering the smoking-contaminated atmosphere in a vehicle, typically in an automobile, to provide clean air.

2. Description of the Prior Art

Smoking in a car with all windows closed results in volumes of smoke and hence in air contamination, as there is no outlet for the smoke. Particularly in summer when a car cooler is used, the car is kept closed so that the inside air circulates through the cooler without being allowed to escape. As a result, the degree of air contamination increases in proportion to the amount of smoking, thus producing a serious adverse effect on the nervous system of the human body. Such smoke sometimes attacks the eyes and causes nervousness, thus interfering with safe driving and leading to traffic accidents. A known car cooler has a filter cloth attached to the suction port thereof, but such filter cloth is intended to prevent the entry of dust into the cooler and has no ability to filter off superfine particles such as smoke.

SUMMARY OF THE INVENTION

The present invention provides an improved apparatus for air conditioning the passenger space in a motor vehicle for cooling the same and/or removing tobacco smoke therefrom; the apparatus comprising: (a) an air recirculating channel leading from and returning to said passenger space, (b) fan means in said air recirculating channel operable for circulating air from and to said air passenger space therethrough, (c) heat exchange means in said air recirculating channel operable for cooling the air circulated therethrough, (d) an air filter in said air recirculating channel capable of filtering smoke particles from the air circulated therethrough, and (e) control means operable for causing the so circulated air to pass through or bypass said filter.

BRIEF DESCRIPTION OF THE DRAWINGS

The accompanying drawings illustrate preferred embodiments of the invention. In the drawings:

FIG. 5 is a fragmentary enlarged perspective view of a filter material; and

FIG. 6 shows more completely the arrangement of FIG. 3.

DESCRIPTION OF THE PREFERRED EMBODIMENTS

Figure 1:
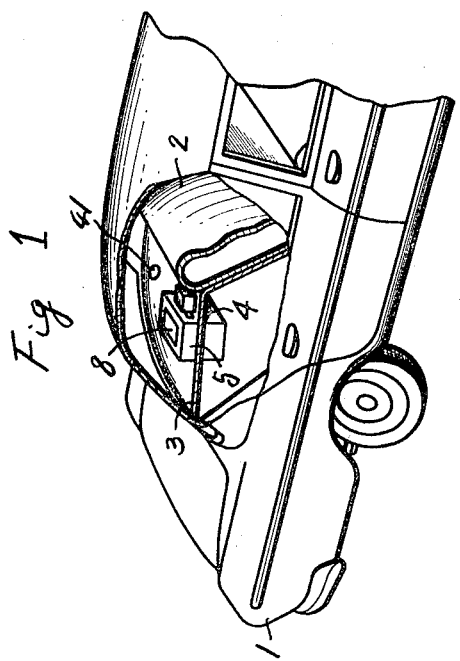
FIG. 1 is a perspective view of the rear half of an automobile equipped with an apparatus according to the invention, the principal portion being shown in section.
Figure 2:
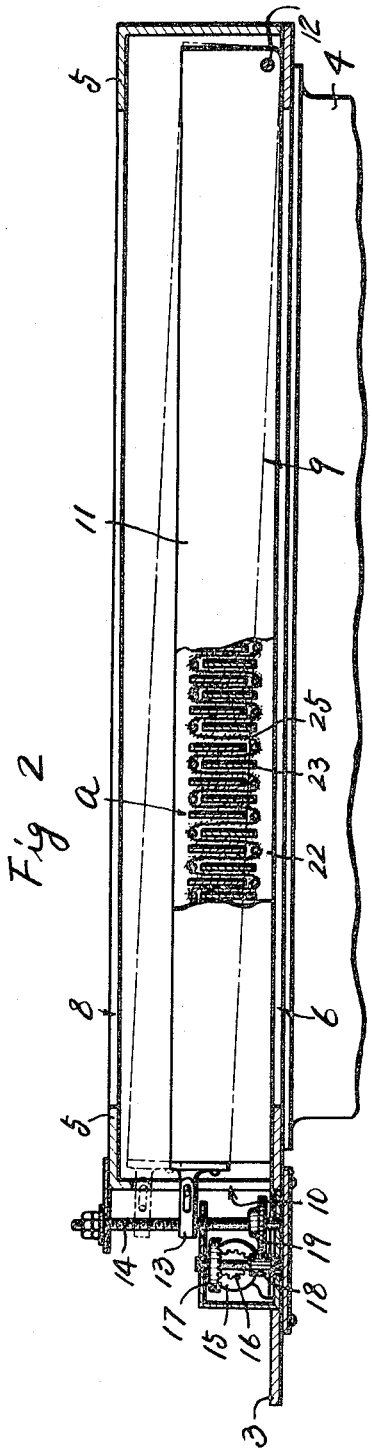
FIG. 2 is a sectional view of a cooler suction port and an air purifier.

Referring to FIGS. 1 and 2 illustrating an embodiment of a car atmosphere purifying apparatus of the invention, the novel apparatus is shown mounted on the suction port of a cooler 4 installed under a shelf plate 3 at the rear seat 2 of an automobile 1. Thus, a box body 5 is placed on the suction port 6 opened into the shelf plate 3. The box body 5 is opened at the top and bottom and at one lateral wall, as indicated at 8, 9, and 10. A filter frame 11 is inserted into the box body 5 through the opening 10 and has one end thereof pivotally connected to the box body by means of a shaft 12. The central region of the front end of the filter frame 11 projects outwardly to form a projecting plate 13, into which a threaded rod 14 is screwed. The threaded rod is erected outside the box body 5 and rotatably supported. It is driven by a small motor 15 disposed outside the box body through gear wheels 16, 17, 18, and 19. The projecting plate 13 is adapted to be rotated relative to the filter frame 11 and slightly expand and contract lengthwise. Therefore, the rotation of the small motor 15 in either a forward or a reverse direction will rotate the threaded rod 14 to cause the filter frame engaged with the threaded rod to be moved upwardly or downwardly around the axis of the shaft 12. Snap switches (not shown) are placed in the circuit of the small motor 15 for reversibly rotating the small motor, it being preferable that said snap switches be disposed at the drivers seat so that the driver may remotely control either of the switches to rotate the small motor 15 in either a forward or a reverse direction, the so provided arrangement constituting a control means operable for causing the circulated air to pass through or bypass the filter.

The structure of the filter frame 11 disposed in the box body 5 is as follows.

A number of corrugated transverse rails 23 are fixed side by side to a frame body 22 which is larger than the opening 8 in the box body 5 and the suction port 6 of the shelf plate 3 and which is narrower than the opening 10. Stretched through spaces between adjacent rails in a zigzag fashion is a textile net 25 having attached thereto a special filter material of sufficiently fine structure to filter off super fine particles such as smoke. Thus, the entire opening in the frame body 22 is covered with the textile net 25. The textile net 25 may, for example, be made in such a way that short fibers produced by extruding through a nozzle a spinnable melt or solution of polystyrene in xylol are blown uniformly against the entire surface of sheeting such as victoria lawn and allowed to settle thereon in a web form or, alternatively, two such structures overlapped together with the individual sheeting disposed facing outward may be used.

The condition shown in FIG. 2 is one in which the filter material $a$ is disposed in an air circulating channel associated with the cooler. That is, the filter frame 11 shuts up the suction port of the cooler 4. Therefore, the car atmosphere is drawn into the cooler through the filter material $a$. The operation of the control means by closing of the snap switch for rotating the small motor in a forward direction will rotate the small motor 15 to turn the threaded rod 14 so that the projecting plate 13 in threaded engagement with the threaded rod will be moved upwardly. Therefore, the filter frame 11 will swing upwardly around the axis of the shaft 12, as shown in chain lines in FIG. 2. Therefore, the car atmosphere will be drawn into the cooler through the opening 10 in the lateral wall of the box body 5 as it passes under the filter frame 11 thus bypassing the filter. That is, the filter frame will be excluded from the air circulating channel. Reversely, in order to place the filter frame 11 in the air circulating channel, the other switch of the control means may be operated. In addition, when the filter frame is brought into its closing or opening position, an upper or a lower limit switch is actuated so that the small motor will be automatically stopped.

Figure 4:
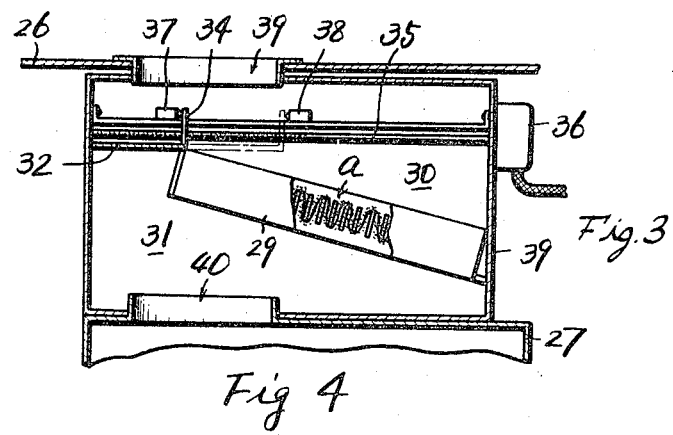
FIG. 4 is a plan view of the apparatus shown in FIG. 3.
Figure 3:
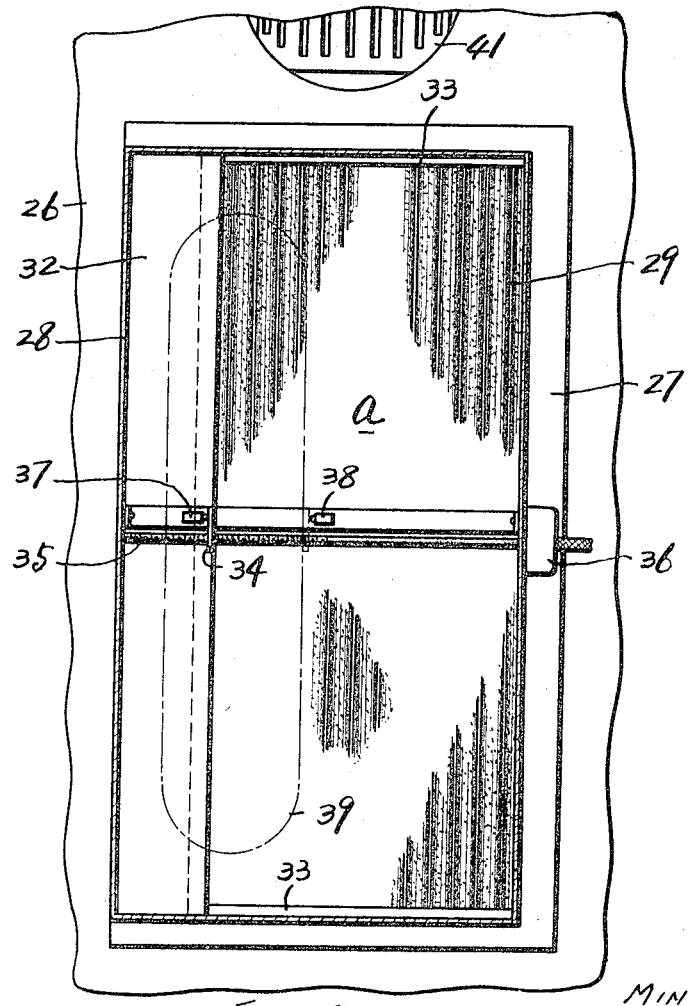
FIG. 3 is a sectional view of a modification of the invention.

FIGS. 3 and 4 show a modification of the atmosphere purifying apparatus according to the invention, wherein a box body 28 is interposed between a shelf plate 26 and a cooler 27 and a filter frame 29 is obliquely disposed in the rear half of the box body 28 to form a filter section 30. The front half of the box body is formed as a non-filter section 31, above which a movable lid 32 is provided. The movable lid 32 is adapted to be moved horizontally back and forth within the box body 28. Thus, the right and left sides of the movable lid are supported on rails 33, 33 on both sides of the box body. The central region of the front edge of the movable lid is provided with an upright edge plate 34, into which a threaded rod 35 is screwed. Therefore, the rotation of a small motor 36 disposed outside the box body will turn the threaded rod 35 to move the movable lid in threaded engagement with said threaded rod. The lower surface of the movable lid is in contact with the upper inclined edge of the inclined filter frame. The numerals 37 and 38 denote limit switches for limiting the movement of the movable lid; 39, a suction port provided in the shelf plate 26; 40, the suction port of the cooler; and 41, a discharge port provided in the shelf plate.

The condition shown in solid lines in FIGS. 3 and 4 is one in which a filter material $a$ is disposed in an air circulating channel associated with the cooler, the car atmosphere being drawn into the suction port 40 of the cooler via the suction port 39 and the filter frame 29. The operation of the control means by closing of the snap switch placed in the circuit of the small motor 36 will turn the threaded rod 35 to move the movable lid 32 to the right as viewed in FIG. 3 until it assumes a position shown in chain lines. Thus, the non-filter region 31 is brought into communication with the car room, so that the air in the room is drawn into the cooler through the non-filter region thus bypassing the filter. In short, the filter plate 29 is excluded from the air circulating channel. In order to put the filter plate 29 in the air circulating channel, the other snap switch of the control means may be closed.

The description given so far refers to cases where the filter plate is installed on the suction port of a cooler, but it may be installed on the discharge port of a cooler or in any other place of an air circulating channel.

It is seen from the above that according to the invention, a filter frame having attached thereto a special filter material capable of filtering off superfine particles such as smoke is installed in an existing car room air circulating channel, said filter frame being adapted to be movable by operation of the control means so that when filtering is not required the filter frame is moved away from the air circulating channel whereas when filtering is required the filter frame is interposed in the air circulating channel. Therefore, with an existing fan utilized without any alteration, the present invention may be used for purifying a car atmosphere, particularly one contaminated with smoking. Since the filter frame may be put in the air circulating channel temporarily for a short time only when the car atmosphere is contaminated with smoking, the object of air purification is achieved without causing any substantial decrease in the efficiency of the cooler.

If such a filter frame is constantly placed in an air circulating channel, the cooling efficiency of the car cooler will be decreased. In order to prevent this, the volume of air has to be increased and hence the air pressure has to be increased. If a larger fan is used to increase the air pressure, this is accompanied by a high noise level and moreover a larger space for installation is required. Noise is to the greatest disadvantage of a car, while an increase in installation space is another undesirable factor to a car, which is limited in room space. The turbo-fan is known as a small fan with high air pressure, but it has disadvantages in that the power consumption is high and the noise level is high. Further, a propeller fan may be used to provide a larger quantity of air, but it has a disadvantage in that the air pressure is low. Thus, this fan is not fit for automobiles, either. Under these circumstances, at present the Silocco fan, which is relatively low in noise level and in power consumption and which provides a large quantity of air and high air pressure, is considered to be the best fan for automobiles.

FIG. 6 shows more completely the arrangement of FIG. 3; indicates the air circulating channel which leads from the motor vehicle passenger space 2 via passage 39, smoke-filter 29 or bypass 32, and passage 40 into the chamber 27 housing the fan means and the cooling means, and thence, via the return duct and outlet 41, to the motor vehicle passenger space 2 again. The reversible motor 36, as above described, in the position shown has been operated by the remote control switch means at the driver's seat to drive shaft 35 in a forward direction of rotation to move the filter bypass valve means 32 forward to its closed position where it has actuated the limit switch 37 to stop the motor. When the operator of the vehicle actuates the operator controlled switch means at the driver's seat to which the motor leads connect, to energize the motor 36 for reverse driving, the motor 36 drives the shaft 35 in the reverse direction until stopped by actuation of limit switch 38, thus moving the valve means 32 to open the filter bypass.

Further, car coolers are required to have a very high cooling capacity for their room size because of high cooling load resulting from direct sunlight exposure of automobiles in the hot season or quick rise in car room temperature during stoppage time or other special conditions inherent in automobiles. In order to compensate for a decrease in the cooling capacity it is also the best measure to provide an insertable type filter so that it may be inserted only when it is desired to remove smoke.

In short, with these considerations in mind, the present invention is so arranged that the filter section is not constantly placed in the air circulating channel of a cooler but is readily inserted therein only when the car atmosphere is contaminated by smoking. Thus the invention is of highly practical use for vehicles having a cooler, preventing the efficiency of such cooler from lowering when air filtration is not going on.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. Air-conditioning apparatus for conditioning the air in the passenger compartment of a motor vehicle, said apparatus comprising:
    a. an air recirculating channel leading from and returning to said passenger compartment,
    b. fan means in said air recirculating channel for circulating air from and to said passenger compartment therethrough,
    c. cooling means in said air recirculating channel operable for cooling the air so circulated therethrough,
    d. a filter means interposed in and positioned across said air recirculating channel and capable of filtering out smoke particles from the air recirculated therethrough,
    e. and flow control means in said air recirculating channel for providing a bypass means for said filter means, comprising adjustable means operable between first and second positions of adjustment for causing the air recirculated therein to pass through said filter means or through said bypass means, respectively, said flow control means comprising driving motor means connected to said adjustable means for selectively moving said adjustable means to said first and second positions of adjustment, respectively, and control means connected to said driving motor means for actuating the same, said control means being operable from the driver's seat of the vehicle.

2. Air conditioning apparatus as claimed in claim 1, wherein said flow control means (e) comprises movable means for supporting said filter means, (d), and movable to said first and second positions of adjustment, in the first of which it positions the filter means (d) across said air recirculation channel, and in the second of which it displaces the filter means (d) to provide the bypass means in said air recirculating channel.

3. Air conditioning apparatus as claimed in claim 1, wherein said bypass means comprises a passage in said air recirculating channel for bypassing said filter means, and valve means movable to either open or close said passage, and wherein said motor means is connected to and operates said valve means.

* * * * *